UNITED STATES PATENT OFFICE.

WILLIAM HILLS, JR., OF EAST ORANGE, NEW JERSEY.

PROCESS OF BLEACHING NUTS.

No. 905,075.　　　Specification of Letters Patent.　　　Patented Nov. 24, 1908.

Application filed April 20, 1908.　Serial No. 428,232.

*To all whom it may concern:*

Be it known that I, WILLIAM HILLS, Jr., of East Orange, in the county of Essex and State of New Jersey, have invented a certain new and useful Improvement in Processes of Bleaching Nuts, and do hereby declare that the following is a full and exact description thereof.

The object of my invention has been to devise a process of bleaching nuts, and particularly walnuts, which process can successfully be used to bleach the shells of the nuts without injuring their meats; and to such ends my invention consists in the process of bleaching hereinafter specified.

While my invention is capable of application with other nuts, I will illustrate it by its application to the bleaching of walnuts. Walnuts frequently have dark-colored shells, and when thus colored are less attractive and sell for a less price than when light-colored, and this notwithstanding many dark-colored walnuts have richer meats than do light-colored ones. It is impossible, as I have found by experiment, to bleach the nuts by dipping them in a bleaching solution, because the fluid will enter within the shell through the cracks which almost invariably exist between the halves of the shell and will injure the meats. I have discovered that I can moisten a granular material with the bleaching solution and thus apply it to the shells of the nuts without having a sufficient quantity present so that the liquid can enter within the shells and injure the meats.

Obviously there are many fibrous or granular materials which can be moistened with the bleaching solution, which will serve for the purpose. The material which I prefer to use is saw-dust. It is also obvious there are many bleaching solutions which could be used for the purpose. The solution which I prefer to use is an aqueous solution of oxalic acid.

Specifically, I dissolve from 6 to 10 ounces of oxalic acid crystals in about 6 quarts of hot water, and with this quantity moisten about 100 pounds of saw-dust. The saw-dust and walnuts are then preferably placed in a tumbler and the tumbler causes the saw-dust to rub over the surfaces of the nuts so that a thoroughly desirable bleaching is produced. Although the saw-dust holds sufficient of the solution to effect the bleaching, I find that none of the solution enters within the shells and the meats are not injured by the process. The strength of the solution is varied according to the amount of bleaching which the nuts require. After the nuts are bleached, they may be conveniently separated from the saw-dust by letting the mixture run down over a screen.

I claim

1. The process of bleaching nuts, which consists in tumbling the nuts with a granular material so moistened with a bleaching agent as to avoid the presence in the tumbling barrel of any free liquid, and then drying the nuts.

2. The process of bleaching nuts, which consists in tumbling the nuts with sawdust so moistened with a solution of oxalic acid as to avoid the presence in the tumbling barrel of any free liquid, and then drying the nuts.

In testimony that I claim the foregoing I have hereunto set my hand.

WILLIAM HILLS, JR.

Witnesses:
　JAS. W. MCGLONE,
　JOSEPH CHISHOLM.